United States Patent
Kolehmainen et al.

(10) Patent No.: US 10,790,715 B2
(45) Date of Patent: Sep. 29, 2020

(54) END STRUCTURE OF ROTOR OF ELECTRIC MACHINE AND MANUFACTURING METHOD THEREOF

(71) Applicant: ABB Schweiz AG, Baden (CH)

(72) Inventors: Jere Kolehmainen, Saint-Aubin-lès-Elbeuf (FR); Jouni Ikäheimo, Kurikka (FI); Tero Känsäkangas, Vaasa (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/314,717

(22) PCT Filed: Jul. 1, 2016

(86) PCT No.: PCT/EP2016/065562
§ 371 (c)(1),
(2) Date: Jan. 2, 2019

(87) PCT Pub. No.: WO2018/001524
PCT Pub. Date: Jan. 4, 2018

(65) Prior Publication Data
US 2019/0348880 A1  Nov. 14, 2019

(51) Int. Cl.
*H02K 1/30* (2006.01)
*H02K 15/00* (2006.01)
*H02K 19/14* (2006.01)

(52) U.S. Cl.
CPC ........... *H02K 1/30* (2013.01); *H02K 15/0012* (2013.01); *H02K 19/14* (2013.01)

(58) Field of Classification Search
CPC ....... H02K 1/30; H02K 15/0012; H02K 19/14
USPC .............................. 310/156.22, 211, 216.058
See application file for complete search history.

(56) References Cited

U.S. PATENT DOCUMENTS

| 1,156,364 | A | | 10/1915 | McCollum |
| 3,194,996 | A | | 7/1965 | Lynn |
| 5,828,152 | A | * | 10/1998 | Takeda .................. H02K 1/278 310/156.19 |
| 9,973,067 | B2 | * | 5/2018 | Hanna ................. H02K 17/165 |

(Continued)

FOREIGN PATENT DOCUMENTS

CN        202374144 U    8/2012
DE   102015204872 A1    4/2016

(Continued)

OTHER PUBLICATIONS

European Patent Office, International Search Report & Written Opinion issued in corresponding Application No. PCT/EP2016/065562, dated Nov. 8, 2016, 13 pp.

(Continued)

*Primary Examiner* — Tulsidas C Patel
*Assistant Examiner* — Rashad H Johnson
(74) *Attorney, Agent, or Firm* — Taft Stettinius & Hollister LLP

(57) ABSTRACT

An end structure for a rotor of an electric machine is attachable to an end of the rotor. The end structure includes a ring arrangement, a rotational axis of which is parallel to that of the stacked rotor, and at least one reinforcing structure at least partly within the ring arrangement. A value of a tensile strength of the at least one reinforcing structure is higher than that of the ring arrangement.

10 Claims, 6 Drawing Sheets

(56) References Cited

U.S. PATENT DOCUMENTS

| | | | |
|---|---|---|---|
| 2009/0267432 A1* | 10/2009 | Henry | H02K 5/225 310/71 |
| 2013/0154430 A1 | 6/2013 | Dragon et al. | |
| 2014/0265717 A1 | 9/2014 | Boxberg et al. | |
| 2019/0006920 A1* | 1/2019 | Agapiou | H02K 17/165 |
| 2019/0229569 A1* | 7/2019 | Li | H02K 5/132 |

FOREIGN PATENT DOCUMENTS

| | | |
|---|---|---|
| EP | 0557368 B1 | 9/1994 |
| EP | 2779384 A2 | 9/2014 |
| GB | 1060628 A | 3/1967 |
| JP | 2000232760 A | 8/2000 |
| KR | 20150035227 A | 4/2015 |

OTHER PUBLICATIONS

European Patent Office, Office Action issued in corresponding Application No. 16734371.4, dated Nov. 8, 2019, 10 pp.
Indian Patent Office, Office Action issued in corresponding Application No. 201947000005, dated Mar. 1, 2020, 6 pp.

* cited by examiner

END STRUCTURE OF ROTOR OF ELECTRIC MACHINE AND MANUFACTURING METHOD THEREOF

FIELD

The invention relates to an end structure of a rotor of an electric machine and a manufacturing method thereof.

BACKGROUND

A rotor of a direct-online synchronous reluctance motor (DOL SynRM) requires end rings at both ends of the stack of the rotor. Also a traditional induction motor (IM) is manufactured in a similar manner. The DOL SynRM rotor has mask plate and end ring casted against it. However, the end ring is under heavy stress during the operation of the motor and the end ring may break because of the stress.

Hence, there is a need to improve the rotor.

BRIEF DESCRIPTION

The present invention seeks to provide an improvement associated with the rotor. According to an aspect of the present invention, there is provided an end structure for a rotor of an electric machine as specified in claim 1.

According to another aspect of the present invention, there is provided a rotor of an electric machine as specified in claim 8.

According to another aspect of the present invention, there is provided an electric machine as specified in claim 9.

According to another aspect of the present invention, there is provided method of manufacturing an end structure for a rotor of an electric machine as specified in claim 10.

The invention has advantages. The rotor structure becomes stronger with the reinforcement, which enables a wider range of rotational speeds of the machine.

LIST OF DRAWINGS

Example embodiments of the present invention are described below, by way of example only, with reference to the accompanying drawings, in which FIGS. 1A and 1B illustrate an example of an end structure for a rotor of an electric machine;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. It is apparent to a person skilled in the art that the described apparatus may also comprise other functions and structures than those described in Figures and text. It should be appreciated that details of some functions and structures are irrelevant to the actual invention. Therefore, they need not be discussed in more detail here.

In the prior art, the end ring may break because the casted end ring is against smooth surface with no support other than cage bars and the ring itself. In the IM motors similar problems have risen when high-speed motors are casted. In the prior art, the end ring must be supported with separate supporting ring which slows down production.

Figure 1A:
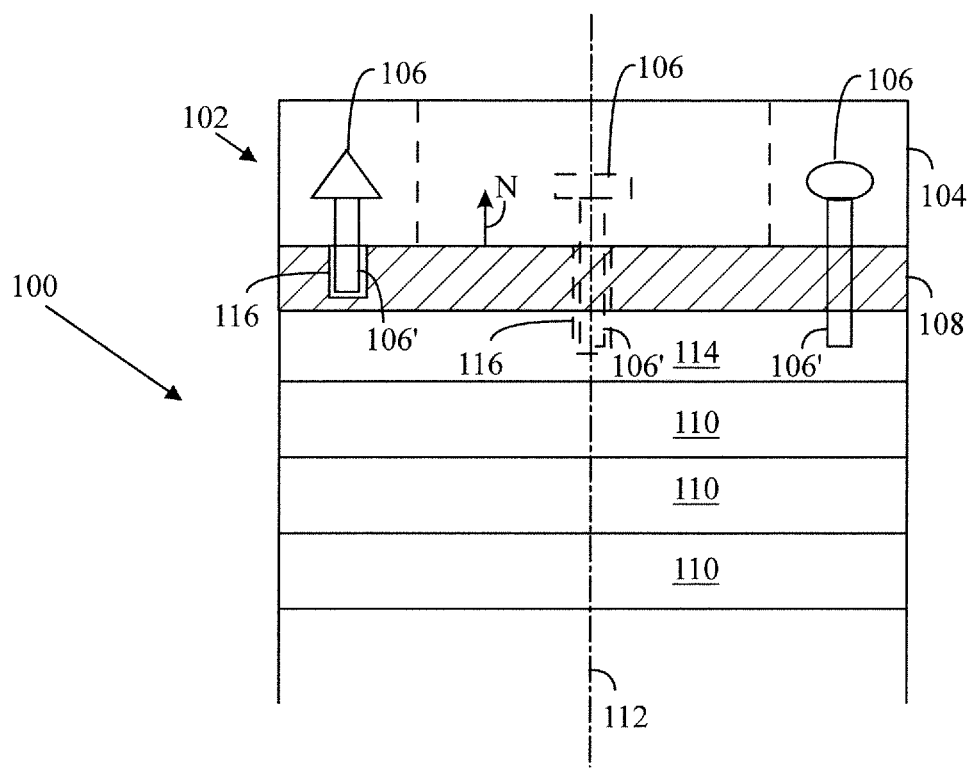
Figure 1B:
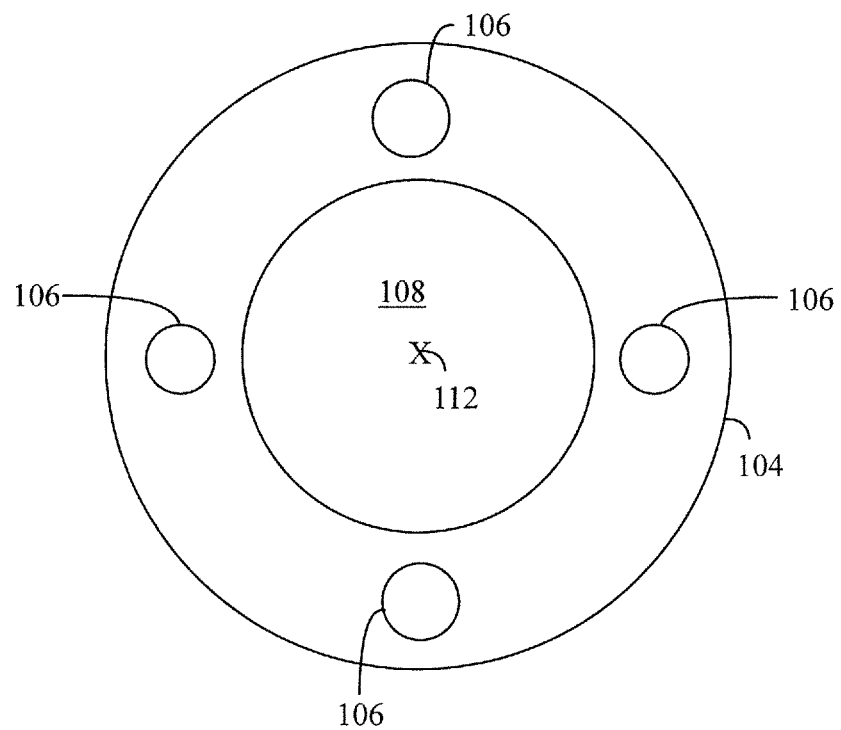

FIGS. 1A and 1B illustrates an example of an end structure 102 for a rotor 100 of an electric machine which may be an electric motor or an electric generator. It is a known fact that the electric motor may be used as the electric generator and vice versa. The rotor may be for a direct-online synchronous reluctance motor or generator, for example. FIG. 1A shows the rotor 100 from a side and FIG. 1B is a top view of the rotor 100.

An end structure 102 may be attached to at least one end plate 108 of the stacked rotor 100 or to at least one stack element 114 of the stacked rotor 100 which are outermost from the center of the rotor 100. The end plate 108 may also be called as a mask plate. The end structure 102 comprises a ring arrangement 104 a rotational axis 112 of which is parallel to that of the stacked rotor 100 and at least one reinforcing structure 106. The combination of the ring arrangement 104 and the at least one reinforcing structure is a matrix. In general, the term "matrix" may mean that two different kind substances or structures are mixed such that one substance or structure surrounds another substance or structure. If there are more than two substances or structure, at least two of them realize the previous condition. Typically the mixing of the at least two substances or structures is deterministic. Material of the end structure 102 may be stainless steel, electrical steel or any other structurally sound material. The matrix may also refer to a composite.

The at least one reinforcing structure 106 is attachable to an end of the rotor 100.

The at least one reinforcement structure 106 is at least partly within the ring arrangement 104. The ring arrangement 104 may be cast for having the at least one reinforcement structure 106 at least partly within the ring arrangement 104. A value of a tensile strength of the at least one reinforcing structure 106 is higher than that of the ring arrangement 104. In other words, a value of a tensile strength of material of the at least one reinforcing structure 106 is higher than that of material of the ring arrangement 104. The material of the at least one reinforcement structure 106 may be steel, for example. The material of the ring arrangement 104 may be aluminum, aluminum compound, copper, gold, silver or the like, for example.

In an embodiment, the reinforcing structure 106 may comprise at least one stud 106' (various kinds of studs can be seen in FIG. 1A). The at least one stud 106' may be attached to the end plate 108 of the stacked rotor 100 or to an outermost stack element 114 of the stacked rotor 100. A longitudinal axis of the at least one stud 106' may be at least approximately parallel to the rotational axis 112 of the rotor 100. The longitudinal axis of the at least one stud 106' may be at least approximately parallel to a normal N of the end plate 108.

The studs 106' inserted into end plate 108 give additional support for the ring arrangement 104 which may act as an end ring. The studs 106' may transfer some of the axial and radial forces of the ring arrangement 104 into the studs 106'.

Figure 2A:
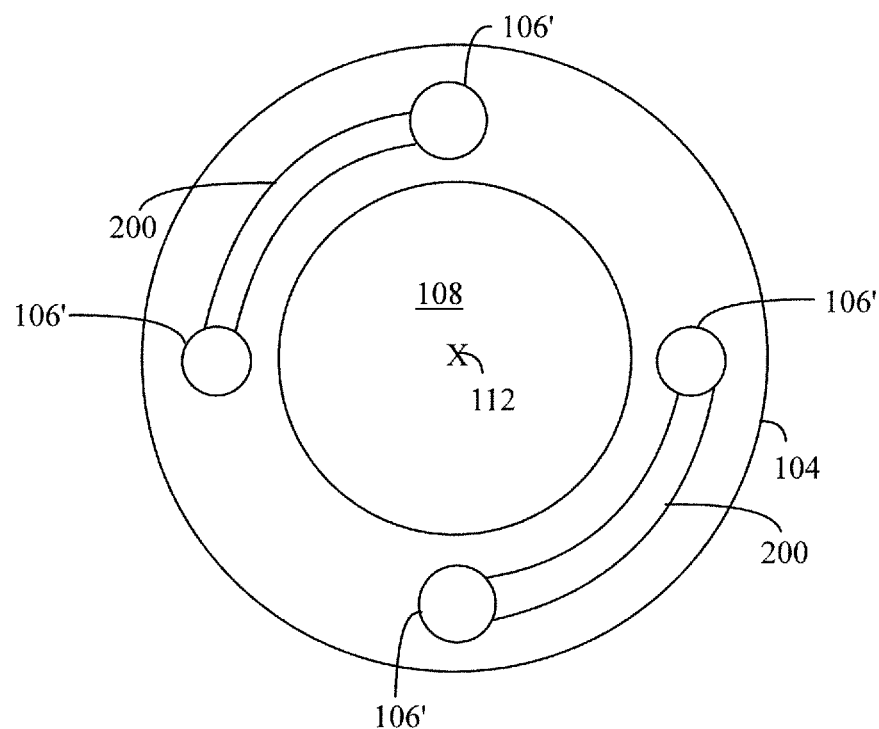
FIGS. 2A and 2B illustrates examples where the reinforcing structure comprises at least one curved bar.

In an embodiment an example of which is illustrated in FIG. 2A, the reinforcing structure 106 may comprise at least one curved bar 200. Each of the at least one curved bar 200 may be connected and attached with at least two studs 106'. Here the term bar means a straight or curved piece of solid material. The length of the bar 200 is larger than its thickness. The bar 200 is also rigid, and it is used as a mechanical support for the ring arrangement 104.

Figure 2B:
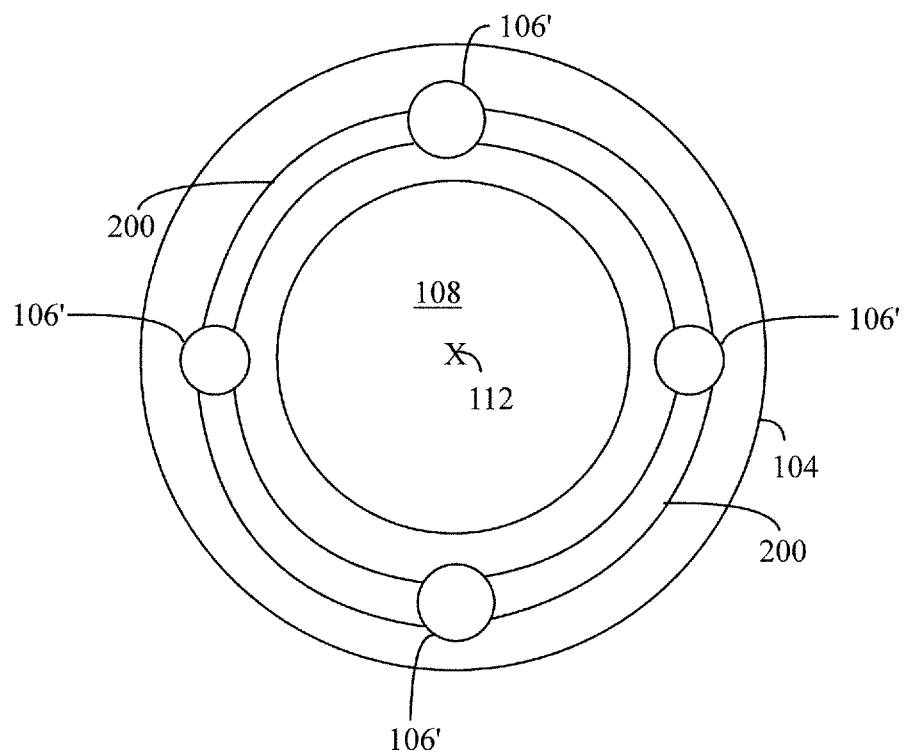

In an embodiment an example of which is illustrated in FIG. 2B, the curved bar 200 may be a circular structure round the rotational axis 112 of the rotor 100.

In an embodiment examples of which are shown in FIG. 1A, the at least one stud 106' may be inserted in a hole 116 of the end plate 108 or the outermost stack element 114. A cross section of the hole 116 may be matched with a cross section of the stud 106'. In such a case, a diameter of the hole 116 may be at least approximately as large as a diameter of the stud 106'.

In an embodiment, the at least one stud 106' may have a screw thread. In an embodiment, the hole 116 for the stud 106' may have a screw thread. In an embodiment, a screw thread of the stud 106' and a screw thread of the hole 116, into which the stud 106' is intended to be inserted, may be equivalent for enabling stud 106' to be screwed into the hole 116.

The end plate 108 of the DOL SynRM has stud holes 116 for later use. Those holes 116 or additionally drilled holes 116 can be used to insert short steel studs 106' into the end plate 108 for creating a foundation for the ring arrangement 104 (or the end ring 400 shown in FIG. 4) to stick on. This provides a better base for the ring arrangement 104 compared to the DOL SynRM's smooth end plate of the prior art. Because the studs 106' are not extended to full length of the rotor 100, no cage structure is formed with the studs 106'. The studs 106' may be just lengthy enough to extend from the ring arrangement 104 to the at least one end plate 108 or to the at least one outer stack element 114 between the end plate 108 and the middle of the stack of the rotor 100 in a direction parallel to the rotational axis 112 of the rotor 100.

In an embodiment examples of which are illustrated in FIGS. 3A to 3D, the reinforcing structure 106 may comprise at least one reinforcing plate 300, 302 with perforations or the at least one reinforcing wire mesh 300, 302 made of wires. When a plurality of reinforcing plates and/or sheet 300, 302 are used the reinforcing plates/wire meshes 300, 302 may be separated from each other with washers, such as washer 301. The washers 301 may be attached to the studs 106'. The washers 301 provide space between reinforcing plates/wire meshes 300, 302 such that the ring arrangement 104 of the end structure 102 of is more loosely and evenly distributed. In an embodiment, the washers may be the bottom of the mold when the material of the ring arrangement 104 is cast. Namely, the washers may keep the reinforcing plates/wire meshes 300, 302 above the bottom of the mold and then the reinforcing plates/wire meshes 300, 302 are left inside the cast ring arrangement 104.

Figure 3A:
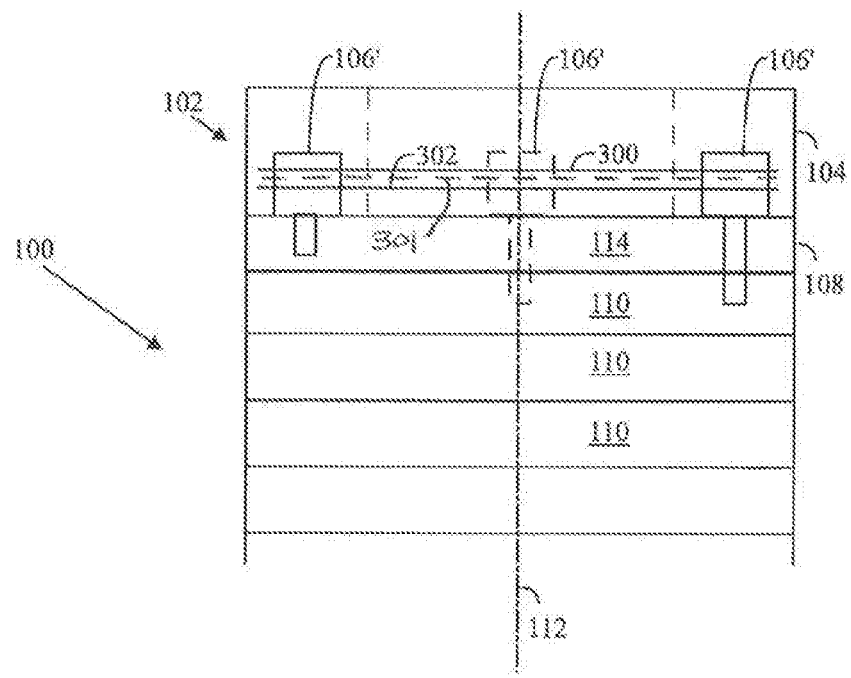
FIGS. 3A to 3D illustrate examples where the reinforcing structure comprises at least one reinforcing plate.
Figure 3B:
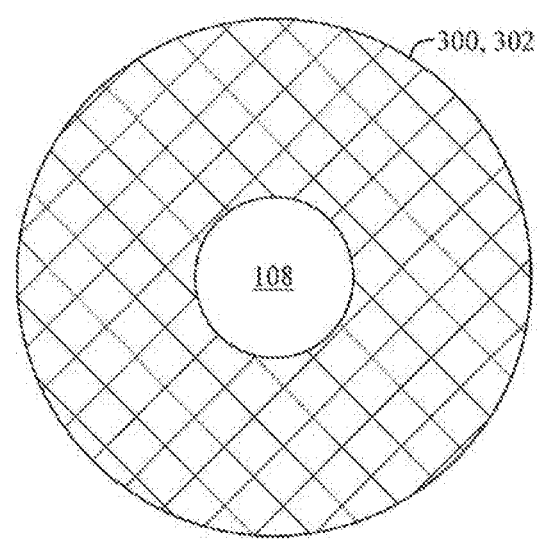
Figure 3C:
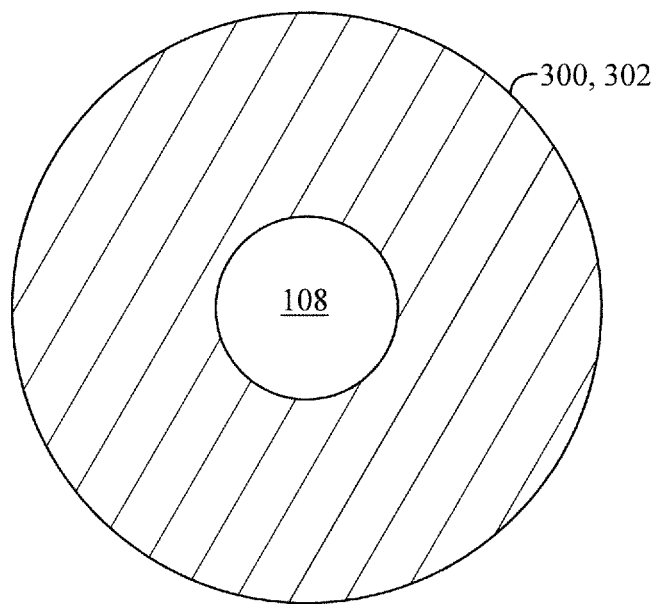
Figure 3D:
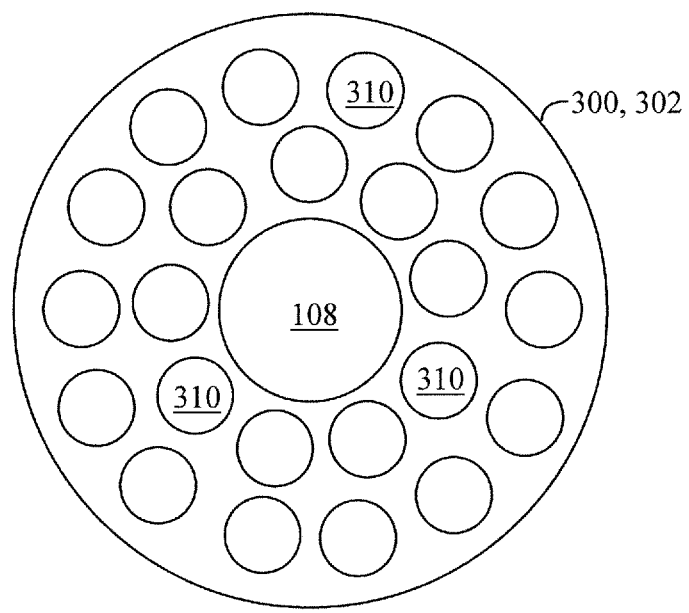

FIG. 3B illustrates a wire mesh where the wires cross each other. FIG. 3C illustrates a wire mesh with straight wires which don't cross each other. FIG. 3D illustrates a reinforcing plate 300, 302 with holes 310. That is, the reinforcing plate 300, 302 may be perforated. The reinforcing plate 300, 302 may comprise metal, carbon fiber and/or ceramic material, for example. The wire mesh may comprise wires of metal covered with carbon fiber or ceramic material, for example.

In general, the reinforcing plate 300, 302 may be made electrical steel or stainless steel to prevent problems related to inductance.

The at least one reinforcing plate 300, 302 may take some of the axial and radial forces of the ring arrangement 104, and because the at least one reinforcing plate 300, 302 is more rigid body, it is stronger. The at least one reinforcing plate 300, 302 may convey the forces to the laminated stack and/or to the end plate 108.

The at least one reinforcing plate 300, 302 may be prefabricated. Then the rotor stacks may be faster manufactured on the site.

Figure 4:
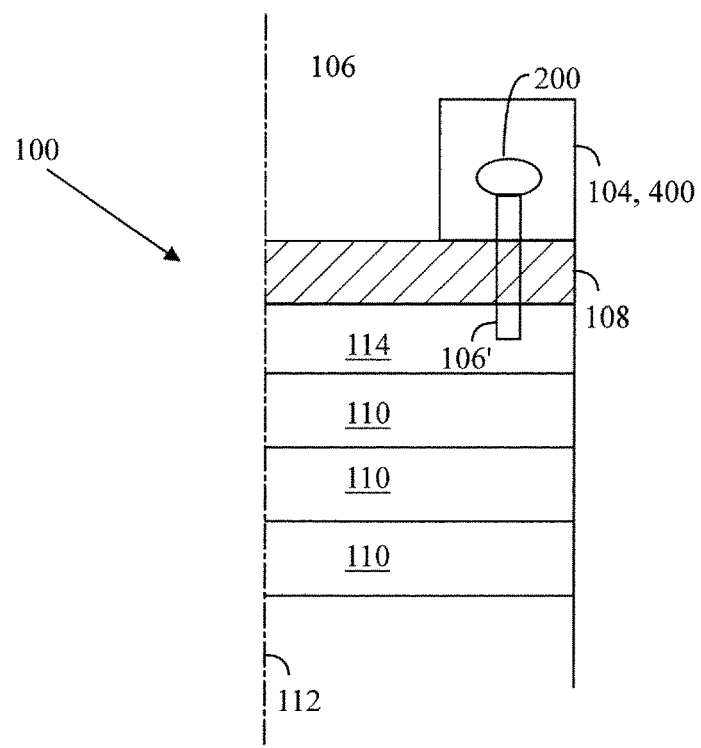
FIG. 4 illustrates an example of an end ring with at least one stud and the curved bar.

FIG. 4 shows a cross section of half the rotor 100. In an embodiment, the ring arrangement 104 may comprise an end ring 400. The ring arrangement 104 may also be the end ring 400 such that the studs 106' and the potential curved bar 200 are fused in the end ring 400. The ring arrangement 104 may comprise the at least one reinforcing structure 106 at least partly within the end ring 400. The at least one reinforcing structure 106 may be at least partly cast within the end ring 400. The reinforcing structure 106 may comprise the curved bar 200 which may be a whole ring round the rotational axis 112 of the rotor 100. The curved bar 200 or the ring may similar to those illustrated in FIGS. 2A and 2B.

It is possible to install the supporting curved bar 200 made out of high-strength steel which is then held at correct position with by the studs 106' installed into end plate 108 or the at least one stack element 114. The end plate 108 is not necessary because the studs 106' may be added to the traditional lamination also. The ring arrangement 104 may be a ring-like structure of various sizes and shapes. Even a mesh-like design may be done to the ring arrangement 104.

Figure 5:
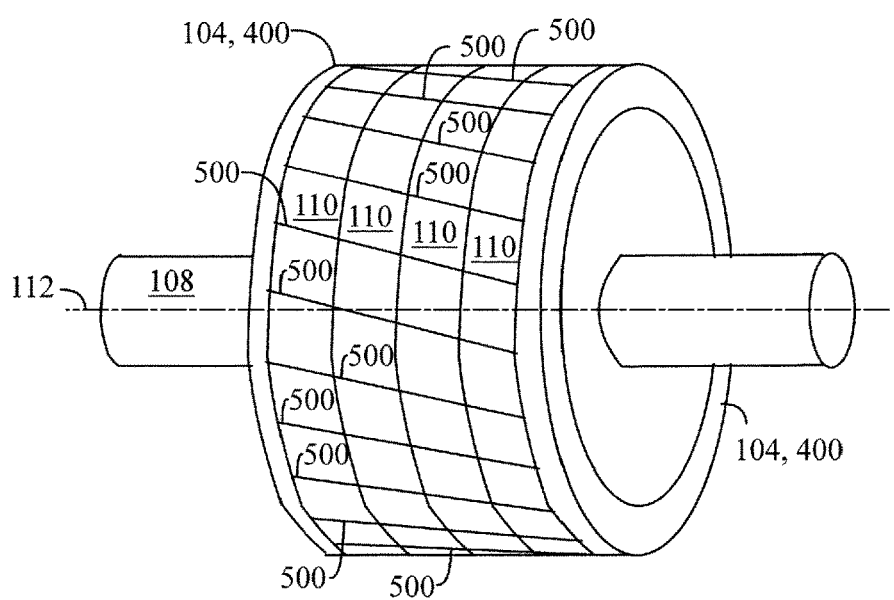
FIG. 5 illustrates an example of an induction machine.

FIG. 5 illustrates an example of an induction motor (IM). Alternatively, the example may refer to an induction generator. The conduction bars 500 (tilted lines) form with the ring structure 104 or the end ring 400 a squirrel cage of the rotor 100 of the induction motor/generator. For IMs, irrespective of their speed, there is no need for a separate turning of the end ring and installation of supporting rings. Additionally, the high-speed IMs can be produced in such way that it doesn't essentially differ from a traditional IM rotor casting. Only some sheets may be added on the top and bottom parts of the lamination stack to create the reinforcement.

In the DOL SynRM case, the matrix structure 104 reinforces the rotor 100 making a wider range of rotation speeds possible. A maximum rotation speed of the rotor 100 may be higher than in the prior art. Manufacturing of such a rotor is also not different from the IM manufacturing.

Figure 6:
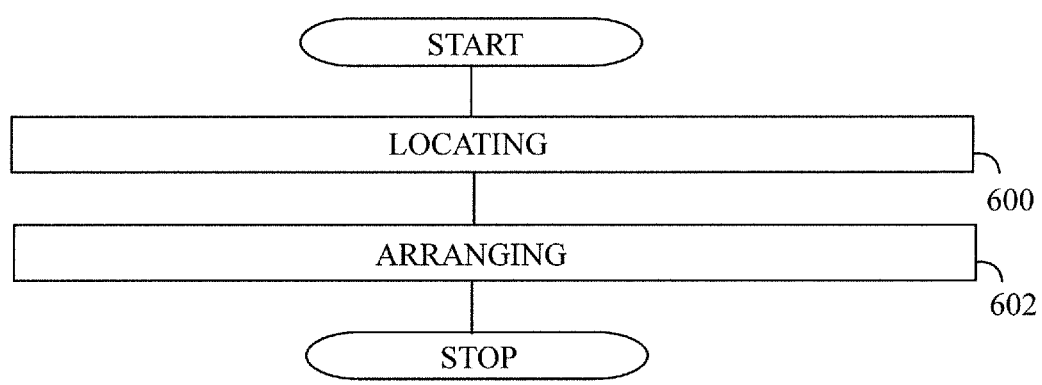
FIG. 6 illustrates of an example of a flow chart of a manufacturing method.

FIG. 6 is a flow chart of a manufacturing method of a rotor 100. In step 600, at least one reinforcing structure 106 is located at an end of the rotor 102. In step 602, a ring arrangement 104 of an end structure 102 is arranged in contact with the end of the rotor 100, and the at least one reinforcing structure 106 is arranged at least partly within the ring arrangement 104, a rotational axis 112 of the ring arrangement 104 being parallel to that of the stacked rotor 100, a value of a tensile strength of the at least one reinforcing structure 106 being higher than that of the ring arrangement 104.

In step 600, the at least one reinforcing structure 106 may be attached to the end plate 108 of the stacked rotor 100 or an outermost stack element 114. In general, the at least one reinforcing structure 106 may also be attached to one or more stack elements below the outermost stack element 114. However, the at least one reinforcing structure 106 is limited not to continue through the rotor 102.

It will be obvious to a person skilled in the art that, as technology advances, the inventive concept can be implemented in various ways. The invention and its embodiments are not limited to the example embodiments described above but may vary within the scope of the claims.

The invention claimed is:

1. An end structure for a stacked rotor of an electric machine, the end structure attachable to an end of the stacked rotor, comprising:
   a ring arrangement, a rotational axis of which is parallel to that of the stacked rotor, and at least one reinforcing structure of the end structure;
   at least one stud which is attachable to an end plate of the stacked rotor and to an outermost stack element of the stacked rotor, a longitudinal axis of the at least one stud being at least approximately parallel to the rotational axis of the stacked rotor;
   the at least one reinforcing structure of the end structure comprising the following attached with the at least one stud along the longitudinal axis of the at least one stud: at least two reinforcing plates each comprising perforations and separated by a washer; at least two wire mesh separated by a washer; or at least one reinforcing plate comprising perforations and at least one wire mesh separated by a washer; and
   the at least one reinforcing structure being at least partly within the ring arrangement, the ring arrangement being configured to act as an end ring of the stacked rotor, and a value of a tensile strength of the at least one reinforcing structure being higher than that of the ring arrangement.

2. The end structure of claim 1, wherein the reinforcing structure comprises at least one curved bar that is connected to at least two studs attached to the end plate.

3. The end structure of claim 1, wherein the at least one stud is insertable in a hole of the end plate and/or the outermost stack element, a cross section of the hole being matched with a cross section of the stud.

4. The end structure of claim 1, which further comprises a plurality of reinforcing plates with the perforations are attached with at least one stud at a plurality of positions along the longitudinal axis of the at least one stud.

5. The end structure of claim 1, wherein the reinforcing structure comprises at least one wire mesh.

6. The end structure of claim 5, which further comprises a plurality of reinforcing wire meshes are attached with at least one stud at a plurality of positions along the longitudinal axis of the at least one stud.

7. The end structure of claim 1, wherein the ring arrangement comprises an end ring and the at least one reinforcing structure is at least partly cast within the end ring.

8. A stacked rotor of an electric machine, the stacked rotor comprises an end structure, the end structure being attachable to an end of the stacked rotor, and the end structure comprising:
   a ring arrangement, a rotational axis of which is parallel to that of the stacked rotor, and at least one reinforcing structure of the end structure;
   at least one stud which is attachable to an end plate of the stacked rotor and to an outermost stack element of the stacked rotor, a longitudinal axis of the at least one stud being at least approximately parallel to the rotational axis of the stacked rotor;
   the at least one reinforcing structure of the end structure comprising the following attached with the at least one stud along the longitudinal axis of the at least one stud: at least two reinforcing plates each comprising perforations and separated by a washer; at least two wire mesh separated by a washer; or at least one reinforcing plate comprising perforations and at least one wire mesh separated by a washer; and
   the at least one reinforcing structure being at least partly within the ring arrangement, the ring arrangement being configured to act as an end ring of the stacked rotor, and a value of a tensile strength of the at least one reinforcing structure being higher than that of the ring arrangement.

9. An electric machine, the machine comprises a stacked rotor with an end structure, the end structure being attachable to an end of the stacked rotor, and the end structure comprising:
   a ring arrangement, a rotational axis of which is parallel to that of the stacked rotor, and at least one reinforcing structure of the end structure;
   at least one stud which is attachable to an end plate of the stacked rotor and to an outermost stack element of the stacked rotor, a longitudinal axis of the at least one stud being at least approximately parallel to the rotational axis of the stacked rotor;
   the at least one reinforcing structure of the end structure comprising the following attached with the at least one stud along the longitudinal axis of the at least one stud: at least two reinforcing plates each comprising perforations and separated by a washer; at least two wire mesh separated by a washer; or at least one reinforcing plate comprising perforations and at least one wire mesh separated by a washer; and
   the at least one reinforcing structure being at least partly within the ring arrangement, the ring arrangement being configured to act as an end ring of the stacked rotor, and a value of a tensile strength of the at least one reinforcing structure being higher than that of the ring arrangement.

10. A method of manufacturing a stacked rotor of an electric machine, wherein the method comprises:
   locating at least one reinforcing structure, a rotational axis of which is parallel to that of the stacked rotor, at an end of the stacked rotor;
   arranging a ring arrangement of an end structure in contact with the end of the rotor,
   attaching at least one stud to an end plate of the stacked rotor and to an outermost stack element of the stacked rotor, a longitudinal axis of the at least one stud being at least approximately parallel to the rotational axis of the stacked rotor;
   attaching the at least one reinforcing structure with at least one stud at a plurality of positions along the longitudinal axis of the at least one stud, the at least one reinforcing structure comprising: at least two reinforcing plates each comprising perforations and separated by a washer; at least two wire mesh separated by a washer; or at least one reinforcing plate comprising perforations and at least one wire mesh separated by a washer;
   arranging the at least one reinforcing structure at least partly within the ring arrangement, a rotational axis of the ring arrangement being parallel to that of the stacked rotor, a value of a tensile strength of the at least one reinforcing structure being higher than that of the ring arrangement, which acts as an end ring of the stacked rotor.

* * * * *